United States Patent [19]
Fruchterman et al.

[11] Patent Number: 5,470,233
[45] Date of Patent: Nov. 28, 1995

[54] SYSTEM AND METHOD FOR TRACKING A PEDESTRIAN

[75] Inventors: James R. Fruchterman, Palo Alto; William C. Schwegler, San Jose; Bruce W. Merritt, Palo Alto, all of Calif.; Charles LaPierre, Ottawa, Canada

[73] Assignee: Arkenstone, Inc., Sunnyvale, Calif.

[21] Appl. No.: 210,239

[22] Filed: Mar. 17, 1994

[51] Int. Cl.⁶ .................................................. G09B 21/00
[52] U.S. Cl. ........................ 434/112; 434/116; 434/365; 340/825.19; 340/825.49; 364/449
[58] Field of Search .................................. 434/112, 116, 434/308, 365; 340/825.19, 825.36, 825.49; 364/424.01, 443, 449, 450, 460, 578

[56] References Cited

U.S. PATENT DOCUMENTS

| | | | |
|---|---|---|---|
| 4,694,494 | 9/1987 | Woolfson | 434/112 X |
| 4,731,613 | 3/1988 | Endo et al. | 364/450 X |
| 5,032,836 | 7/1991 | Ono et al. | 340/825.19 X |
| 5,117,363 | 5/1992 | Akiyama et al. | 364/449 |
| 5,119,301 | 6/1992 | Shimizu et al. | 364/450 |
| 5,189,430 | 2/1993 | Yano et al. | 364/449 X |
| 5,225,842 | 7/1993 | Brown et al. | 342/357 |
| 5,343,399 | 8/1994 | Yokoyama et al. | 364/449 |
| 5,345,388 | 9/1994 | Kashiwazaki | 364/449 |
| 5,371,497 | 12/1994 | Nimura et al. | 364/449 X |

FOREIGN PATENT DOCUMENTS 0583214  2/1994  European Pat. Off. ............ 434/112

OTHER PUBLICATIONS

"Active Localization of Virtual Sounds" By Loomis et al, *The Journal of the Acoustical Society of America*, vol. 88, No. 4, Oct. 1990, pp. 1757–1764.

"*An Interdisciplinary Concurrent Design Methodology as Applied to the Navigator Wearable Computer System*" by Daniel P. Siewiorek, et al., Abstract with 3 figures, 1993.

EtakMap® database product brochure, May 1992.

"Sony Mobile Navigation System Technology Description", Sony News and Information, Feb. 8, 1994.

"Global Explorer", DeLorme Mapping Brochure, 1993.

"Better Than a Cane", Discover, Oct. 1993, pp. 20–21.

Primary Examiner—Joe H. Cheng
Attorney, Agent, or Firm—Knobbe, Martens, Olson & Bear

[57] ABSTRACT

The present invention is a global positioning system that helps a blind pedestrian navigate through a city. This system uses the Department of Defense Global Positioning System (GPS) and a Differential GPS receiver to determine a pedestrian's longitude and latitude. Once these coordinates have been determined, they are correlated with a computerized map database. The map database holds the names and coordinates of specific locations, such as intersections, in a particular region. The system of the present invention retrieves the names of locations from the map database that are near the pedestrian. These names are then output to a voice synthesizer.

27 Claims, 7 Drawing Sheets

Microfiche Appendix Included
(856 Microfiche, 16 Pages)

SYSTEM AND METHOD FOR TRACKING A PEDESTRIAN

MICROFICHE APPENDIX

A Microfiche Appendix containing computer source code is attached. The Microfiche Appendix comprises 16 sheets of microfiche having 856 frames, including one title frame.

The Microfiche Appendix contains material which is subject to copyright protection. The copyright owner has no objection to the reproduction of such material, as it appears in the files of the Patent and Trademark Office, but otherwise reserves all copyright rights whatsoever.

FIELD OF THE INVENTION

This invention relates to map positioning hardware and software for presenting a user's geographical position by voice output. Specifically, this invention is a global positioning device for visually handicapped users. This device phonetically describes a geographical position by correlating coordinates from global positioning satellites to earthbound locations or allows a user to navigate around a map without using the global positioning satellite.

BACKGROUND OF THE INVENTION

Finding one's exact location in an unfamiliar city has presented a problem for both civilian and military populations. Discovering a location is even more challenging for the visually impaired. The visual clues used by sighted individuals in an unfamiliar place are useless to the blind pedestrian.

To provide the military with a location determination system, the U.S. Department of Defense has devised a system that can very accurately locate any point in three dimensional space. This system is known as the global positioning system (GPS).

There are twenty-four non-geosynchronous satellites circling the earth as part of a $12 billion Department of Defense location determination system. An accurate location can be determined by measuring the distance to at least three satellites. Since the signals produced by the satellites are not classified by the military, civilian companies have produced portable GPS receivers for determining exact locations on the earth. A GPS receiver can pinpoint a location on the earth to within about 100 meters. Using a technology called Differential GPS (DGPS), wherein fluctuations in the GPS location compared to a known true location are eliminated, an earth-bound location can be determined within about one meter. DGPS is a service provided by several vendors, wherein they broadcast GPS corrections on a sideband FM frequency. A user purchases a supplementary DGPS receiver that collects these corrections in real time.

Several commercial electronic maps using GPS technology have been produced. For instance, automobile guidance systems using technology from Etak Incorporated and Trimble Navigation have been distributed by a Toshiba/Blaupunkt venture. Etak produces digital map databases that are used to correlate GPS longitude and latitude coordinates with attributes on the earth. For example, the geographic coordinates of major roads and intersections are included in the database. Software developers use these databases to produce programs which correlate GPS coordinates with mapped locations in real time. Computer programs such as these have been used to track automobiles as they traverse city streets. These programs gather the fluctuating GPS coordinates as the car drives along a road, and correlate those coordinate locations on a stored map. A moving cursor indicates the automobile's position as it drives towards a destination. However, so far these systems have not been a major commercial success. It is possible that their commercial failure is related to substituting one hard-to-read map format (paper street maps) for another (street maps on a small computer monitor). It is also likely that such precision exceeds most practical uses.

In the commercial sector there are also several companies that have developed Microsoft Windows based electronic maps that accept GPS input. The Astia system from Liikkuva Systems International, (Cameron Park, Calif.) is an "executive" mobile computing system with integrated map that accepts GPS input. Astia includes a laptop computer that has a GPS satellite input and can continuously determine a user's position while driving along a street. A cursor shows the automobile's position on the map at any one time. An audio card can be purchased with the Astia system for verbally outputting the names of locations stored in the map database.

DeLorme Mapping (Freeport, Me.) has also built an automobile navigation system that relies on GPS technology. The DeLorme APS Mapkit SV is a software system that runs on a notebook computer. This system provides a user with an updated map of their position at any time. Their map includes over 1.1 million geographic and man-made features, including rivers, lakes, railroads, parks and monuments.

Technology has now progressed where hand-held GPS positioning products for hiking, boating or hunting are only $500–$1000. The Magellan GPS Trailblazer and Trimble Scout are hand-held GPS receivers that allow recording of paths between points and give bearing/distances to predetermined locations. However, these devices do not correlate latitude/longitude coordinates with locations on a pre-stored map. Without an integrated map database these products are limited to locating positions that have been input by the user. For instance, the location of campsites, cars and fishing holes can be input and then relocated on a subsequent trip. Although the hand-held systems are good tools for retracing a user's steps from/to a user-defined location, they rely heavily on the user's perception of location and mapping knowledge. The hand-held devices do not give the user an appropriate road to take to reach a desired location, only the straight line distance and direction. For this reason, they are not very helpful for getting a user to a specific point in an unknown city.

All of these systems have been designed with the assumption that the user is driving a car, or can see the features of the road or environment. In designing a system for the visually handicapped many other considerations must be addressed. Of course, paramount is a user interface that effectively communicates with the blind user. The majority of prior map location devices produce clear, full color maps of locations that are useless to a blind person. In addition, automobile direction systems are designed with the assumption that the car is always on a road. A blind pedestrian, of course, may be walking along a road, through an adjacent parking lot or in an alley.

In addition, map locations that are appropriate for a sighted driving person are likely inappropriate for a walking blind pedestrian. The locations that interest a blind pedestrian are normally within their close proximity. For instance, a blind pedestrian might want location updates every 250 feet, whereas a driver might only want to know their location every mile. In addition, landmarks such as mailboxes, bus stops and bridge overpasses are important to the blind pedestrian, but might be inconsequential to a person that is driving a car.

For this reason, the currently available geopositioning systems are unsuitable for the blind pedestrian. While others have proposed GPS type systems for the visually handicapped (Golledge et al. (1991) *Int. J. Geographical Information Systems* 5(4):373–394) an efficient system has not yet been developed. The present invention provides an accurate global positioning system for a blind pedestrian.

SUMMARY OF THE INVENTION

This invention includes a software program that runs a satellite geopositioning system primarily intended for people that are visually impaired. This software program is termed herein "Sextant". In a preferred embodiment, the Sextant software runs on the Microsoft Windows 3.1 platform. Sextant accurately determines a user's geographical location in a region using the GPS and then appropriately presents features of that location to the user verbally or through a Braille display. Importantly, the presentation of features describing each location is in a format that is appropriate for a blind pedestrian.

A complete geopositioning system comprises a GPS, a DGPS receiver, a notebook computer, a database, Sextant software, and an output system. Preferably, the output system is a voice synthesizer. However, other types of output designed for the blind are anticipated. For instance, a Braille display could be used to output the location information to the user instead of a voice synthesizer.

The system receives a first set of coordinates from the GPS receiver and then correlates it with a second set of coordinates in the map database. The map database is preferably stored in the memory of the notebook computer. It should be appreciated that a single set of coordinates received from the GPS can correlate with a plurality of coordinates in the database. For example, a single GPS coordinate might be near five separate locations. Each of these locations could be correlated with the received coordinates.

Different users can incorporate locations and features of particular importance into a user-defined map database. A user incorporates new locations into the user-defined database by appending GPS coordinates and corresponding features into the database. Finding the proper GPS coordinates for a new location can be done by retrieving GPS satellite information while standing at the new location. In normal operation, a user will stop at a new location that he wishes to make part of his user-defined map database. By taking a GPS reading at that location, and then typing the corresponding feature information into the laptop computer, a user-defined map database is created.

It should also be appreciated that the system of the present invention can be used without GPS input as an intelligent, talking map. Points of interest are announced by using the arrow keys on the keypad to move forward, backward, right or left. By pressing one of the aforementioned keys, the next location in that direction is spoken to the user. In this manner a user can determine, for example, the next three intersections along a chosen path. The Sextant software will announce the names of the intersections as the user presses the arrow key.

In one feature of the present invention, the Sextant software automatically records the locations of a pedestrian as he walks along a path from a start position to an end position. The system records the GPS coordinates of known geographical locations that the user passes during his route and stores them to a history file. These locations might be street intersections, phone booths, bus stops and the like. The user can then use the Sextant software to replay the history file. At this stage the Sextant software retrieves the history file of GPS locations, and outputs the features of those locations. A "compact" routine is included for removing information about undesirable locations along the path. For instance, the blind pedestrian might want to only keep the locations of intersections, bus stops and mailboxes on the route, but discard the locations corresponding to lakes, parks, and business districts. The user has the option of setting the type of geographical locations to keep during a compact routine by means of a preference file.

The preference file can include a list of desired and undesired locations to be stored during a compact routine. During a compact routine the Sextant software compares the retrieved location features with the preference file to determine if any particular location should be output to the pedestrian. The history file can be replayed at any time along a route so that the pedestrian can replay, for example, the last three landmarks he passed. This feature is quite useful for a blind pedestrian that has no means for affixing his location other than the history of where he has been. It can be appreciated that the history file will include the direction changes made in route so that, for instance, the system would say "you turned left on Elm Street and walked 100 feet to Park Blvd. and then turned right on Park Blvd. and walked 225 feet to your present position." The system has the capability to record a pedestrian's current position while replaying the history file.

In another feature of the invention, Sextant warns a user that he is veering off the selected path. Once the user is a specified distance from the path (as set in the preference file), the system verbally states that the user has veered a specific distance in a particular direction. However, unlike currently available automobile tracking systems, the Sextant system would state "You have moved 100 feet to the north of your chosen path. Please turn around and walk in the other direction until you reach the next street which is Elm. Turn right at Elm to continue on your chosen path." The speech output is clear and concise so that a visually impaired pedestrian can reorient himself to his chosen path. As can be appreciated, this type of directional sophistication has not been made available in automobile positioning systems.

The chosen path is normally stored in the notebook computer as a history file, as discussed above, but could also be a path that has been preselected by Sextant. For example, the user could enter start and end points of his path, and then let the Sextant software determine the shortest route between the points. This feature is already available in a number of the automobile guidance systems.

In another feature of the present invention, the Sextant software can "skip" spoken commands. Each location in Sextant is associated with specific features. For example, an address location might be described by its address, city, state and zip code. These features may derive from a commercial map database, or have been entered into a map database overlay file by the user. However, while walking, the blind pedestrian might not want to listen to every feature of a specific location. For this reason, Sextant includes a skip function that immediately stops saying the name of the current feature, and skips to a description of the next feature. The user can continue to press the skip button until all of the features have been either skipped or spoken.

In another feature of the present invention, an area of exclusion is defined in the map database. This area of exclusion is a polygon that defines a boundary that the pedestrian would either not want to enter, or be notified when crossing. It can be appreciated that dates and times can be features of the area of exclusion so that, for instance, a user is warned when he is in the park after dark. Other types of areas of exclusion might be construction zones, airports, freeway ramps, bodies of water or high traffic congestion regions.

It can be appreciated that during some modes of operation, spoken statements such as "your destination is five miles southwest of your present location" are likely much less desirable than spoken directions on how to arrive at the destination. Commands such as "go to the second street and turn left, then walk 100 feet to arrive at your destination, 1000 Broadway Street" are more desirable. As part of this system, the present invention provides a destination acknowledgment routine. When a pedestrian reaches his destination, the Sextant software outputs a command to the voice processor that says "you have reached your destination at 1000 Broadway Street." In this embodiment, the GPS software keeps track of the pedestrian along his path. Once the pedestrian arrives within a prescribed distance (as set by a preference file) to their desired target, the system outputs the acknowledgment signal.

As this system is designed for the blind pedestrian, a standard keyboard might not be the most convenient means of inputting commands. In addition, all of the menu choices should be spoken so that the user can determine his position in the software. For this reason, the Sextant software interprets commands from a standard 17 key, IBM-type numeric keypad. All menu choices can be garnered from this keypad, so that the blind pedestrian has a more direct method of retrieving information. The keypad can be attached with an extension connector on the laptop, a parallel port connecter and TSR software, or any other means, as long as keystrokes on the keypad can be relayed to DOS/Windows. It should also be appreciated that the present invention is not limited to this type of keypad input. Other input devices, such as joysticks, directional switches and the like could be modified for use with the present invention by those of skill in the art.

The Sextant software program of the present invention is separate from the GPS hardware, so it can evolve independently of the hardware. As the Sextant software is GPS device independent, other vendor's GPS products can be supported via device drivers that provide a common protocol for time, position and other related parameters. It is expected that GPS hardware will evolve rapidly in the next few years, providing even more accurate positioning data to the system of the present invention.

DETAILED DESCRIPTION OF THE INVENTION

For convenience, the detailed description section has been divided into the following 11 principal sections: Introduction, Definition of Terms, Menus, Keypad Layout, Map Overlay System, Areas of Exclusion, Initialization, Where am I Function, Voice History Routine, Voice Skipping Routine and Location Acknowledgement Routine.

The software of the present invention was written and compiled using MICROSOFT Visual C++ (C 8.0) Professional Version 1.0. The attached flowcharts provide a functional representation that illustrates selected features of the source code contained in the attached Microfiche Appendix.

INTRODUCTION

Figure 1:
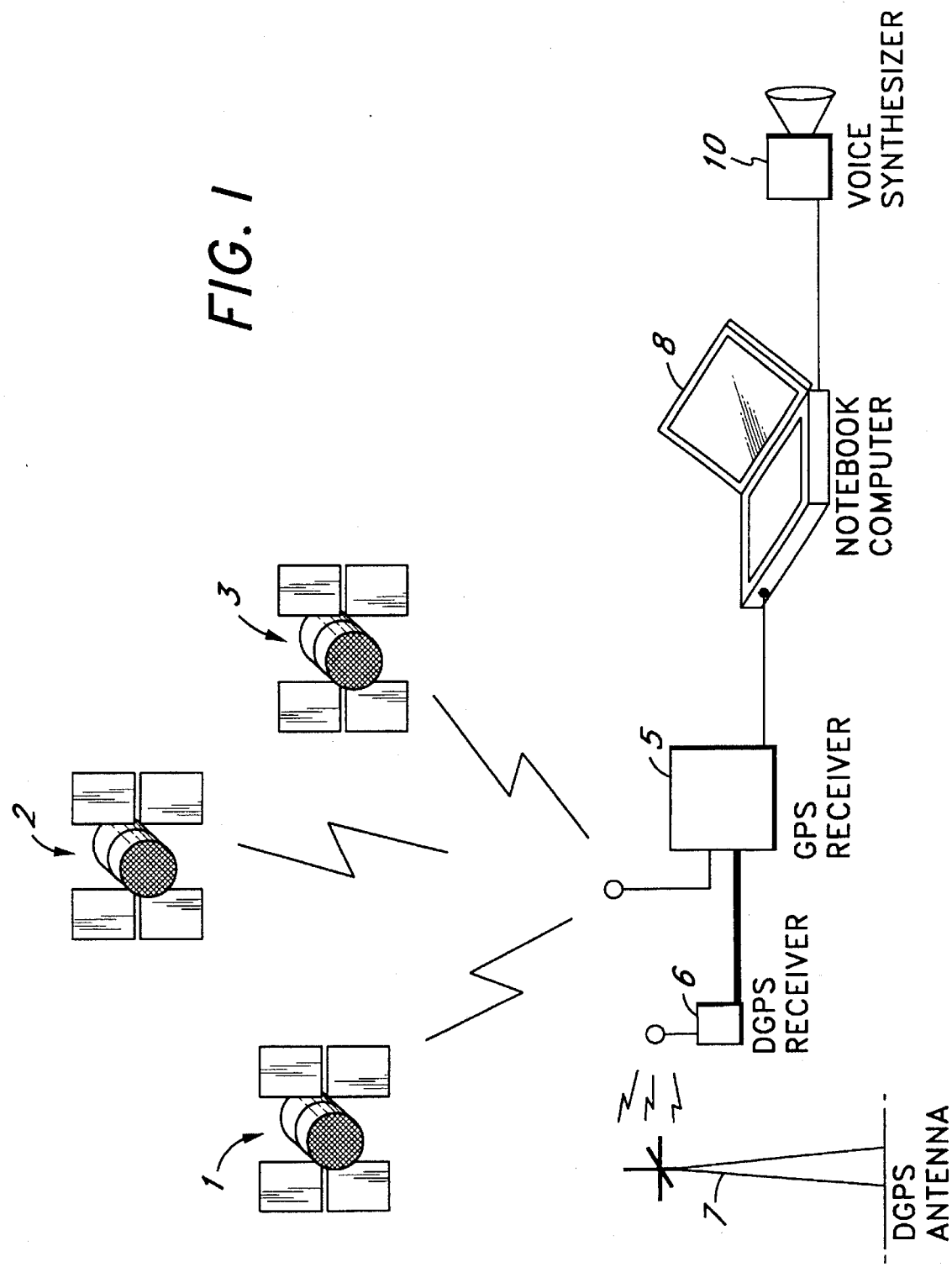
FIG. 1 is a diagram of the geopositioning system of the present invention.

The present invention is a geopositioning system for the visually handicapped. The system utilizes the United States Department of Defense Global Positioning System (GPS). The GPS is a series of twenty-four satellites that circle the earth in a non-geosynchronous orbit. These satellites emit signals that can be received and used to determine an exact distance from each satellite. By knowing the exact distance from at least three satellites, a system can calculate, with incredible accuracy, its position in three dimensional space. As shown in FIG. 1, the system of the present invention has several distinct components.

Satellites 1, 2 and 3 generate a signal that is received by a GPS receiver 5. These receivers are well known in the art, and can be purchased from companies such as Trimble Navigation (San Jose, Calif.). The Trimble Mobile GPSTM is a GPS interface for a notebook computer. A DGPS receiver 6 is linked to the GPS receiver 5 thereby gathering FM sideband signals indicating the GPS corrections that are broadcast by a DGPS antenna 7. The GPS receiver 5 interfaces with a Notebook computer 8 via a standard laptop PCMCIA slot. The GPS receiver transfers the corrected satellite signals into the notebook computer 8. The notebook computer preferably contains an INTEL 80486 microprocessor. The Sextant software of the present invention records the GPS longitude/latitude coordinates and compares them with a stored digital map. Digital maps, such as those available from Etak Incorporated, are well known in the art. Normally, a single map database covers a specific geographical region, such as California. A suite of maps is available that cover virtually the entire world.

The name of the map point nearest the retrieved satellite coordinate and appropriate for a blind pedestrian is retrieved. Any features, such as name, address or business hours are then sent to a voice synthesizer 10 which speaks the features. The voice synthesizer is preferably a DECtalk PC speech synthesizer. This is the most fundamental operation of the system. However, important to the correct operation for the blind is the choice of what the computer says once the location is known.

Figure 2:
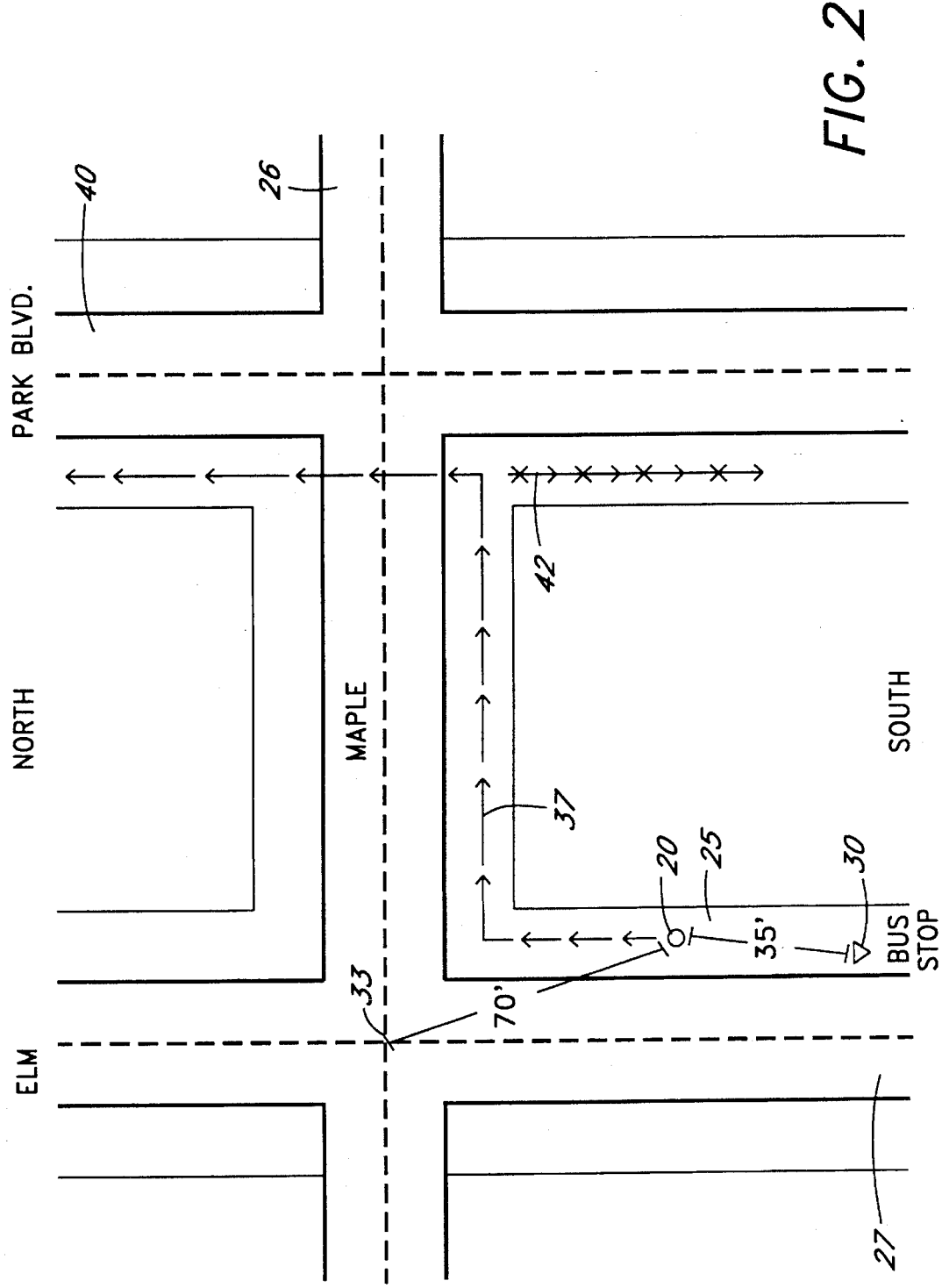
FIG. 2 is a diagram illustrating a pedestrian walking along a path on a sidewalk using the global positioning system of the present invention.

A schematic representation of a pedestrian using the system of the present invention is provided in FIG. 2. A pedestrian 20 travels North-bound on a sidewalk 25 that borders Elm street 27. The pedestrian 20 has just passed a bus stop 30 and is approaching an intersection 33 of Maple 26 and Elm 27. By using the Sextant software and GPS system, the pedestrian 20 can identify his exact position along the sidewalk 25.

To locate his position, the pedestrian presses a "Where am I" key, the detailed function of which is described in more detail below. After the key is pressed, the system retrieves GPS coordinates corresponding to the pedestrian's current position. The Sextant software begins searching the map database stored on the hard disk of the notebook computer to find locations that are nearest the pedestrian 20. As the closest location is bus stop 30, the system would say, for example, "You have passed the bus stop at 240 Elm Street and continued walking for thirty-five feet." As the pedestrian is also close to the intersection 33, the software could optionally output, for example, "You are seventy feet South of the intersection at Maple and Elm." The system calculates the distance from the pedestrian 20 to the defined locations, such as the bus stop 30, by knowing the geographical coordinates of each location, and then determining the distance between those coordinates. Calculations for determining the distance between two sets of geographical coordinates are well known to those of skill in the art.

After the pedestrian 20 has located his position, he continues to travel along a path 37 on the sidewalk 25. The pedestrian 20 can press the "Where am I" button at any point along the path 37 to find his location. If the pedestrian 20 is following a path that has been already stored in the computer, the system has the ability to alert him when it is time to make directional changes. For example, as the pedestrian 20 approaches the intersection 33, the system would say "You have reached the corner of Maple and Elm, turn right heading East and continue for one hundred feet until you reach the corner of Maple and Park Blvd." In this manner, the Sextant software can guide a blind pedestrian to his final destination.

The software of the present invention also provides a "following" feature wherein it tracks a pedestrian's progress along a predetermined path. For example, referring again to FIG. 2, the pedestrian 20 might continue along the path 37 until he reaches Park Blvd. 40, but mistakenly turn right, and follow path 42. As discussed above, the Sextant software can be set to constantly update with the pedestrian's GPS position. In this tracking mode, the software tracks the pedestrian's location, looking for variations between the present location, and his chosen path. If the pedestrian 20 veers a predetermined distance from the correct path 37, the system will alert him of the mistake. It should be appreciated that the amount of variance allowed by the system prior to sending out a warning message can be set by the user. For instance the system might say "You have veered thirty feet South of your chosen path by turning right at Park Blvd. instead of left. Please turn 180 degrees and walk in the opposite direction to rejoin your chosen path."

Definition of Terms

Point of Interest (POI)

A point of interest is an address that has some significance to the user. It can be accompanied by a describing text, notes or optionally by a digital recording of the user's voice, assuming that the system is equipped with digital audio digitizing hardware. A point of interest is not necessarily a way point or part of a path. A POI either has an effective radius or can be a polygon defining an area (as a zone). A POI may or may not exist in the data base as a current address and it may be outside of a boundary covered by the current database. POIs have the following attributes:

- Category: Points of interest are separated into categories having features in common (example: Bus Stops)—Although the Sextant software provides an initial "starter" set of categories, the user is at liberty to add as many new ones as he sees fit.
- Latitude/longitude: A series of latitudes and longitudes may correspond to a single POI when the POI is a zone.
- Name (Optional Geocoded Street Address)
- Icons to graphically represent classes of points for sighted users.
- Hours of operation

Points of Interest Database (POIDB)

The Points Of Interest Database is a file that holds the map coordinates and physical address of predefined and user-defined points of interest. This database includes the user-defined database as an overlay to the permanent map database. The user-defined database can be used, for example, to identify local restaurants or important points of interest by taking a GPS reading at that point and then adding a feature description of the point to the Points of Interest Database. This process is discussed in more detail below.

Feature

A feature is an attribute that helps describe a Point of Interest. For example, a feature could be one of the following attributes.

- Address
- Street
- City
- State
- Name of Nearest Street
- Name of Streets at Nearest Intersection
- Distance to Nearest Street
- Distance to Nearest Intersection
- Time-of-day
- Date
- Announce Text Annotation
- Announce Voice Annotation
- Time data base Associated with a feature could be text or voice annotation notes, a radius of interest, time data base (hours open, scheduled stops, etc. . . ).

Feature List Presentation

A Feature list is one or more features, selected by a user's preference file, to describe a Point of Interest. On demand, the preferred features are presented (read aloud), unless the user cancels the presentation or presses the "skip" button on the controller. The skip button immediately stops recitation of the current feature, and forwards the program to begin saying the next feature in the feature list. This process is discussed in more detail below in the section entitled "Voice Skip Function."

Explore Mode Feature List Presentation

When the user presses the select key on the keypad, Sextant retrieves the feature list of what is in front of (facing) the user.

Map Mode Features

By selecting a first point or address, and a second point or address, the user retrieves a feature list presentation, which could include any feature of either point and:
- distance between the points
- bearing between the points
- distance to a point from current position
- heading to a point from current position
- estimated travel time at a preset walking speed

Geocoded Point

A coordinate that exists as a street address. The term "street address" and Geocoded point are used interchangeably herein.

Waypoint

A waypoint is a Point of Interest that is part of one or more paths. These paths define a route from an origin to a destination. A waypoint, however, can be defined that is not part of a path. For instance, a bus stop would be a waypoint that might not be part of a path. All waypoints, by definition, are points of interest. A waypoint is a subclass of Points of Interest.

Path(s)

Paths are defined by two or more waypoints to be traversed in sequence. Paths have a name, points of origin and destination. A pedestrian follows a path to travel from one waypoint to another.

Menus

The following menu options are available in the Sextant system. These menus were created using the Microsoft Windows 3.1 Developers kit and Microsoft C++, both of which are hereby incorporated by reference. One of ordinary skill in the art would be able to reproduce the following menus upon a review of the Microsoft Windows Developers kit and the specification provided herewith. Headers that appear horizontally at the top of the Sextant windows are: FILE; TRAVEL; PATH; POSITION; FIND; MAP; VOICE and HELP. These headers appear in a format that is consistent with the Microsoft Windows 3.1 environment.

Menu Bar Item

File
SETTINGS
  Load Settings . . .
    Load an existing Sextant environment
  Save Settings . . .
    Save the current Sextant environment
  Delete Settings . . .
    Delete the current environment setting
Points of Interest
  Load POIDB . . .
    Load selection from alphabetical list of aggregate POIDB overlays stored in the computer. This overlay database comprises the names of waypoints, zones and their corresponding GPS coordinates. This menu option allows the user to select a POIDB.
  Unload POIDB . . .
    Remove one POIDB from the map. Since the PIODB's are formatted as overlays, one POIDB can be removed, leaving the remaining databases intact. The POIDB to be unloaded is select from list that is presented by voice to the user.
  Kill POIDB . . .
    Permanently delete one POIDB from the disk: select POIDB name from list (note: POIDB must be loaded for this to work).
  Merge POIDB . . .
    Combine two loaded POIDBs into a third one, leaving it loaded and unloading the original two: select POIDB names from list.
  Create POIDB . . .
    Enter a series of Geocoded points into a database as way points, points of interest, or a series of vertices of a polygon (Zone) to be tagged for reference.

Menu Bar Item (continued)

Travel
GPS . . . /EXPLORE . . . {toggle}
  These are not two "modes" but a toggle that determines if current position is constantly updated with GPS coordinates or features. Without the GPS installed, the system defaults to Explore mode. In Explore mode, pressing one of the direction keys retrieves the features of the nearest location in the desired direction. The nearest location is found by checking the Points of Interest database which houses both user-defined locations and the main map database. In GPS mode, the current and closest positions are stored and retrieved as GPS coordinates.
Explore
  The Explore command sets the computer in a mode whereby GPS coordinates are not collected. As the user presses a direction key, the first location in that relative direction is determined. The features of that location are then sent to the voice processor.

A pedestrian in Explore mode can simulate his movement by pressing the direction keys to "walk" along a path. For instance, if the pedestrian wants to recall the names of locations in front of him, he would toggle the system into Explore mode. As the pedestrian pressed the <8> (forward) key, the system would say the name of the next intersection. If the pedestrian pressed a different directional key, the name of the location in that direction would be sent to the speech synthesizer. This implies that the map rotates with the heading so that the up arrow always means straight ahead, and NOT move North-ward.

Time and Distance
  This option provides an odometer and also calculates the elapsed time of trip. The odometer calculation is made by calculating the path length a pedestrian traversed after starting the odometer. The options under this heading are start/stop timer and start/stop odometer. When the odometer is stopped, it no longer updates the path length. Other options under this heading include a reset for both the timer and odometer. By choosing the reset option, the odometer is set to zero feet, and the timer is set to zero minutes.

Landmark

By choosing this menu choice, the system outputs the name, distance and bearing to a selected landmark. The landmark can be selected by inputting the name of the desired landmark, or by picking the landmark from a list presented by Sextant. The list of landmarks is retrieved from locations stored in the Points of Interest database. The ESC key cancels any input. Landmarks can also be specified via Geocode locations or by entering an aggregate list of named waypoints. This option is especially useful for the visually impaired traveller that is, for example, using a cab as transportation to a specific landmark. By continually requesting the distance and bearing to the selected landmark, the visually impaired traveller can determine if he is being driven in the proper direction.

Event Trigger Options

Distance Alarms

This option sets an alarm that is triggered when the distance to a specific Point of Interest (POI), category of POI, waypoint or Zone becomes less (or greater) than specified amount. When this menu choice is set, the system requests the user to input a distance that will be the trigger set point. This set point is stored in memory. During every GPS update, the system calculates the distance to the chosen Point of Interest and compares that distance with the minimum set point in memory. If the distance to the Point of Interest is less than the set point, the alarm message is sent to the voice synthesizer. For example, a user could set an alarm to sound when he is within 3 blocks of a subway station. By choosing the category "subway stations" as the Points of Interest, any location that has that feature will cause the alarm message to be output to the voice synthesizer.

Time-Based Alarms

This option provides the user with the option of setting an alarm to sound based on clock settings. For instance, an alarm can be set by standard, well known methods to sound at a particular time of day or after an elapsed time. Further, this feature can be used as a Countdown timer so that the user is notified after a specified period of time has passed.

Figures 3, 4:
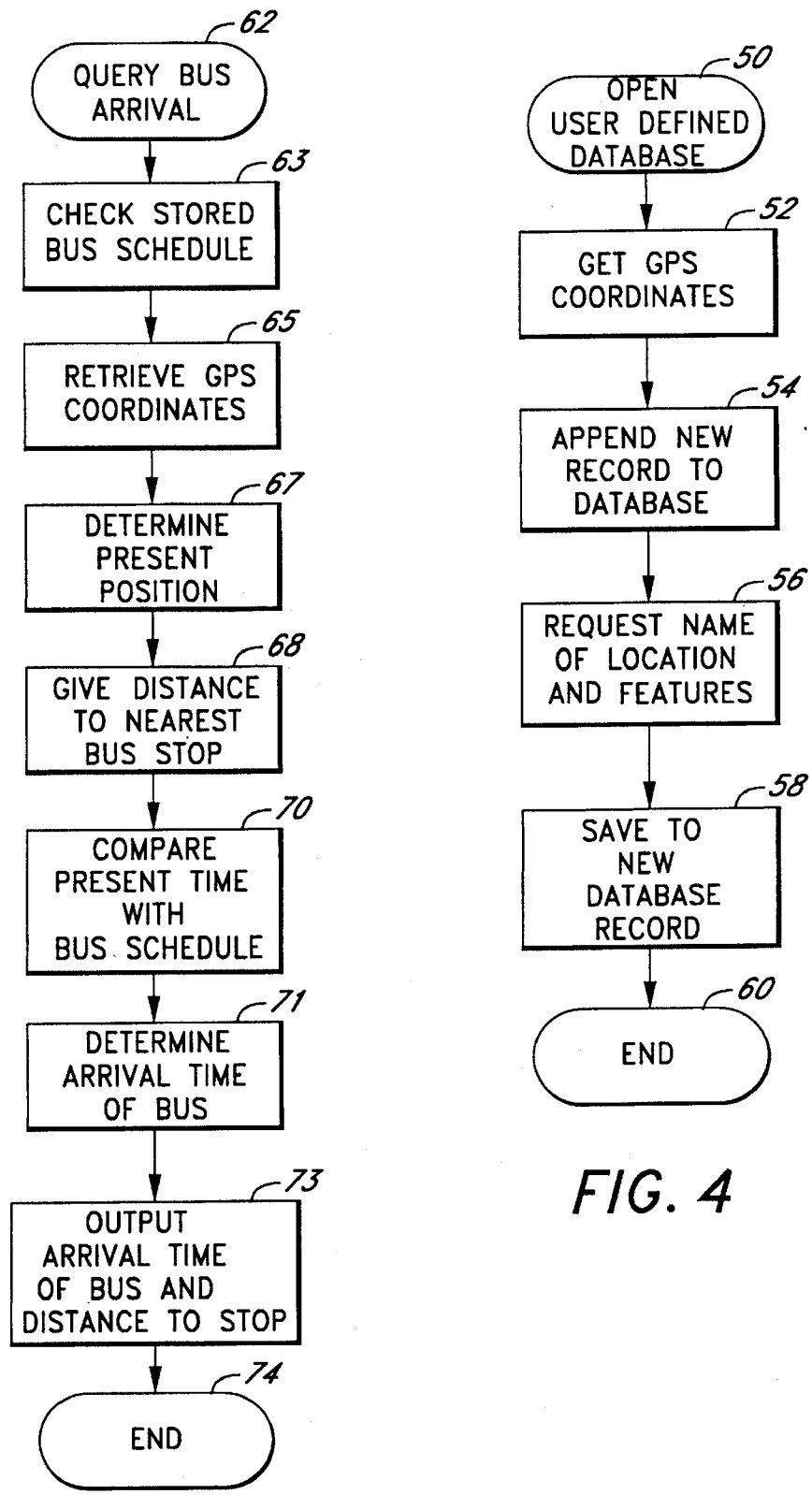
FIG. 3 is a flow diagram illustrating a subroutine for determining the arrival time of a bus using the global positioning system of the present invention.
FIG. 4 is a flow diagram showing a subroutine that stores new locations into the user-defined map database.

The internal clock of the notebook computer is used as the basis for time-keeping. Other types of selections under this menu choice include being notified of a Point of Interests scheduled hours of operation. For example, if the software was programmed with bus stop schedules, as illustrated in FIG. 3, the system would be able to notify a user of the estimated arrival time of their bus.

In start state 62 the user queries the system about the arrival time of the next bus #1. In state 63 the software checks the schedule that is stored on the hard disk of the computer to find the route for bus #1. Once the route is retrieved, the software runs a subroutine that gathers the present GPS coordinates at state 65 and uses them to determine the user's geographical position at state 67. The processes for retrieving the GPS coordinates and determining the corresponding location are discussed at length herein. After the geographical location of the user is determined, the software calculates the distance to the bus stop at state 68 in a similar manner as that discussed for FIG. 2.

Once the distance is known at state 68, the present time is compared at state 70 to the scheduled arrival of Bus #1 at the bus stop. The time until the bus arrives (ie. five minutes) is determined at state 71 by methods that are well known in the art. The Sextant software then outputs the distance and, optionally, direction to the bus stop at state 73 along with the time until its arrival to the voice synthesizer. A sample output, for example, would be: "The Southbound bus #1 is due to arrive at your current position in five minutes". After outputting this statement to the synthesizer in state 73, the subroutine finishes at end state 74.

Change of Direction Alarm

This type of alarm is set to sound when user deviates from a path by more than a preset threshold. This feature was explained in more detail above in association with FIG. 2.

Closest POI

Selecting this option outputs either any/all POIs within a specified radius, the closest POI in a specific direction/range of direction or the nearest POI on the present street/heading.

If POIs had an "Hours of operation" feature associated with them you could request, for example, the pizza parlor on this street that is open." The system would determine the present time, and then search in an expanding radius for the closest location that had the features "pizza parlor" and were open at the present time.

Menu Bar Item (continued)

Path

NOTE: Path operations apply to both GPS and Explore modes. Paths may be exported as individual files so that copies can be given to others. For instance, a user would give a copy of a "safe" path to a friend so that he could walk home without encountering danger.

Each sampled position along a path can have a time stamp associated with it, so the user can re-create a "real-time" excursion by referencing path positions and advancing through them at the speed dictated by their time-stamps (or optionally by varying the replay speed)

Destination

After choosing this menu choice, the Sextant software requests: ALL or Designated destinations?

The user then selects a path destination from an aggregate list of spoken locations. The Sextant software uses this information to plan a path to the selected designation.

Once the destination is known, Sextant queries: All or Loaded Paths?

This option allows for querying all paths for a specified waypoint and then building list of paths that contain it (not necessarily as the path's destination). By choosing the waypoints along a path, the user can force the path to contain a specific waypoint. For example, the user could create a path that has a bus stop as the final destination, but has to pass by a mailbox on the way.

Follow
  This option allows the user to select a path by name from an aggregate list of existing paths. Using the up/down keys, the user advances to next/previous waypoint. The waypoints are described per the "Where Am I" (WAMI) feature list specification.
Suggest
  Menu item only appears when the pathfinding software option is installed.
  Specify: Origin & Destination via Geocode, current position or by picking from aggregate lists of existing named points. Option to keep or cancel suggested path, if kept, path must be named, and will be saved to disk.
Start/Stop Record {toggle}
  This menu item changes to "Stop Record" once a recording has been started.
  On start: prompt for path name before recording begins, implicitly samples position and time and saves them in pathfile on disk. Sample interval is either intersections only or manual (GPS or non-GPS) or by time or distance interval (GPS units only).
Describe
  The user selects a path by name/number for playback (menu item changes to stop playback once initiated). The system operates just as if one was walking along that path, allowing a hands-off description of what a pedestrian would encounter if he traversed the path. In playback mode, the grammatical tense is altered to indicate that the playback was in the past, i.e., "You were on Broadway". This feature is used to differentiate between the current position which is given in the present tense, ie. "You are on Broadway."
Edit
  This function allows editing of accumulated waypoints so that intersections, points of interest or are otherwise uninteresting locations can be deleted.
Delete
  This option deletes and existing path altogether.
Rename
  This option is used to change the name of a path to something else.
Import/Export
  This option provides a subroutine for reading or writing a path from/to a disk file. This feature allows 32 characters to be used for describing a pathname. The normal DOS filename limit is only eight characters. By using this option, users can share paths that they have created.
Compact
  This option removes all points from a path based on user preferences. For example, the user can specify that all locations that are not intersections should be removed from a path. This menu choice is used for removing all the redundant sampled locations taken while a user walks somewhere during the definition of a path, for example.
Speed Control for Describe
  Determines pacing so that a "real-time" description, as discussed above, can be tape-recorded and then replayed.

Menu Bar Item (continued)

Position
  These menu options describe the user's location as it corresponds to the stored map database.
Tell All
General Heading
Geocode
Where Am I (WAMI) Options/Preferences
  This option provides the user with current position information. This feature is discussed at length below in the section entitled "Where Am I Function".

Menu Bar Item (continued)

Find
  Geocode
  Street
  Intersection
  Point of Interest
  Waypoint
  Next Waypoint
  Previous Waypoint
  Selected Waypoint
  To Selected Point of Interest
  Distance between points
    Either selected waypoint, point of interest or Geocoded Place/point.
  Define Waypoint
  Delete Waypoint
  Set Current Position
  Set Geocoded Place
  Set Avoidance Zone
  Set Alarms
  Directional Options
    This determines the message when the user presses the direction keys while in travel mode.

Menu Bar Item (continued)

MAP
  Open Map
  Zoom In
  Zoom Out
  Zoom In Details
  Zoom Out Details

Menu Bar Item (continued)

VOICE
  Volume . . .
  Rate . . .
  Pitch . . .
  Tone . . .
  Punctuation Level . . .
  Speaking Voice
    Select language/voice to be used.
  Turn Speech Off/On Menu Bar Item (continued) . . .

HELP
  Help Index
    Sextant will be the Help text presenter.
  Getting Started
    Sextant presents "Getting Started" file. Get started quickly.
  Learning Sextant
    Sextant presents "Learning Sextant" file. A full manual.

About . . . Standard Windows About box.

Keypad Layout

As the Sextant system is designed for a visually handicapped person, a special keypad layout has been devised. This keypad is based on the standard IBM type numeric extension. The following is a description of each keys function in the Sextant system.

Across the top row:

Keypad Num Lock: Menu Key
  Toggles main menu on and off

Keypad / Forward Slash: Sextant Functions
  Function toggle. Select between travel and explore mode dynamically. Change direction functions from left, right, forward, back to cardinal points of compass, N, S, E, W.

Keypad * Asterisk: Voice Change Key
  Voice control toggle, with the items: Voice rate change, volume change, toggle off. While on, cursor up or down increases or decreases rate or speed.

Keypad–"minus": Help Key
  Help control toggle, with the items: Key describer, Getting started, Learning Sextant, toggle off. Key describer describes the function of the other keys. With this menu choice active the other keys become inactive; the press any key and it will announce its name. Other item offers a detailed explanation to help you decide what to do at any given point.

Keypad+"plus": Reserved for future upgrades

Across the second row:

Keypad 7, Home: Message Repeat:
  Repeat the previous (possibly unsolicited) message that I heard: This brings up a "Browser" that allows replay of the last thing that was spoken (in case you heard it say something, but couldn't understand)

Keypad 8, Up Arrow: What in front/North
  Announces what is in front of current position. Or what is North of current position. This would be "turn and face" what is in front of me while in explore mode. In Map mode your theoretical position is as a point of interest with no heading, it moves your position.

Keypad 9, Pg Up: Reserved for future upgrades

Across the third row:

Keypad 4, Left Arrow: What is left/West
  Announce what is to the left of current position. Or what is to the West of current position.

Keypad 5, Keyboard Enter: Select/Move forward
  Selects the current choice, if you are in a menu or are answering a question that Sextant a posed. In Explore mode will move you forward to the next intersection.

Keypad 6, Right Arrow: What's right/East
  Announce what is to the right of current position. Or what is to the East of current position.

Across the fourth row:

Keypad 3, Pg Down: Reserved for future upgrades

Keypad 2, Down Arrow: What's behind/South
  Announce what is behind current position or what is south of current position.

Keypad 1, End: Reserved for future upgrades

Keypad Enter: Speak key
  Starts and stops reading in Help. Interrupts speech or repeats the current item in a menu or dialogue box.

Across the bottom row:

Keypad 0, Ins, Space Bar: Where Am I?
  Pressing this key gives the users selected positional information stream as selected by the user in Position Options. In another embodiment, a second press of the Where Am I? key stops the voice output.

Format Command Options: These are a sampling of the types of location information that is available after pressing the Where am I key.

Date, time, altitude, nearest address, nearest street name, nearest city, distance to x, where x is nearest street, intersection, nearest way point, nearest point of interest, zone, ETA at X. Distance traveled, (elapsed distance), Estimated Time, time remaining, average speed, max. speed. Warn of specific deviation from chosen path. Current heading. (Landmark: bearing to an object where you specify an object. Where it is relative to you so you can determine short cuts and possible route connections that are "off route").

Keypad . "period", Del: Skip/Delete
  Skip the current information "sound byte" and go on to the next. This will allow the user to quickly get to desired information if a long stream has been assembled. Would act as delete for way points. No change to all other Window keyboard commands (Alt-F4, etc.).

Map Overlay System

The present invention includes a GPS receiver that is linked to a notebook computer having a map database. The preferred map database is EtakMap Premium database provided by Etak Incorporated. This database includes street addresses and ZIP codes with a positionally accurate, classified road network. The Etak map database includes Interstate Highways, U.S. Highways, State Highways, County Highways, Limited Access Roads, Streets, Road Names, Address Ranges, Road Classifications, Five-Digit ZIP codes, State Abbreviations, County Codes, Township (MCD) Codes, City Codes and Water Bodies. Coordinates of features are within +/–20 feet of true position within urbanized areas. Over 95% of street addresses have been geocoded to a single address block on the map. By inputting a street address, the map database can locate its corresponding longitude and latitude. This is very helpful for determining a user's position relative to addresses on the street.

Although the EtakMap Premium map database contains detailed information on roads and street addresses, it does not provide all of the location information that is required by a visually-impaired pedestrian. For instance, longitude and latitude information on bus stops and telephone booths is not incorporated. However, the Sextant system provides a method for including this important information. The Sextant map database can be thought of as existing in layers, with the bottom layer comprising the EtakMap Premium database. Above this layer of coordinates and routes lies a user-defined set of coordinates and location definitions. For example, locations such as bus stops and telephone booths can be added to the Sextant database as an overlay to the basic EtakMap Premium database.

FIG. 4 provides a flow diagram describing the subroutine that stores GPS coordinates and location information to the user-defined map database. As a first step, the user chooses the Load Point of Interest Database (POIDB) selection from alphabetical list of aggregate POIDB overlays (waypoints and zones). The user then selects the desired POIDB name from list. Once the user has chosen the desired POIDB, the computer opens the file into memory as shown in start state 50 of FIG. 4. After the chosen file is opened, GPS coordinates are retrieved from the GPS receiver in state 52 and appended to a new map database record in state 54. A new record is appended in the user-defined database by methods well known in the art. Once the coordinates have been added to the new database record, the software requests the name and any features of the location in state 56. The software stores the name and features in state 58 to the same record as the GPS coordinates that were retrieved in state 52. Once the new database record has been properly updated, the subroutine ends at end state 60.

The user-defined database does not intermingle with the EtakMap database so updates to the basic map can be made at any time without effecting the user-defined locations and features. When the Sextant software is looking for the closest location, it first goes to the EtakMap database and derives the closest location. The closest location in the user-defined database is then evaluated. The location that is closest to the user is sent for voice output.

Areas of Exclusion

An area of exclusion is one type of location that can be created by Sextant in a user-defined map database. Either a circle or a polygon is produced that defines the boundary of a geographic area to be avoided by the pedestrian. This boundary is superimposed over the map database to determine all of the locations that are to be part of the area of exclusion. All of the coordinates corresponding to the interior of the polygon are tagged with a feature that indicates their position in an area of exclusion. Art area of exclusion might be, for instance, a construction zone. A blind pedestrian would want to be warned whenever he was approaching one of these areas, or had selected a path that traversed an area of exclusion.

A user defines an area of exclusion by inputting coordinates that correspond to the corners of a polygon defining its perimeter, or coordinates of a center point of a circle, and a desired radius. In calculating the polygon, a straight line is calculated between each coordinate such that the perimeter of a polygon is defined. The range of coordinates that lie in the area of exclusion are copied to the user-defined map database with a feature designation indicating their position in the area of exclusion and the features of that particular area. Similarly, paths that cross an area of exclusion are either automatically re-routed, or canceled with an explanation being output to the user.

Initialization

The Sextant system is initialized by powering up the notebook computer and loading Microsoft Windows 3.1. The Sextant software is launched from the Microsoft Windows environment. Those of skill in the art will appreciate that the notebook computer can be programmed to automatically load the Sextant Software after boot up.

Once Sextant is running, all output is spoken though the incorporated voice synthesizer. As discussed above, this card is preferably the DECtalk PC voice synthesizer card. In addition, all menu commands are read as the cursor scrolls from one on-screen option to another.

PROGRAM CALLING SEQUENCES:

Sextant.BAT will be the primary calling program. It is a batch file that can be easily customized. SEXTANT.BAT will contain the following line as the program invocation:

WIN SEXTANT DESTINATION

In general Sextant supports the following command line syntax:

SEXTANT m: [drive] [pathname] [map file name] c: [drive] [pathname] [configuration file name]

Where LOCAL.MAP is the first map loaded during the installation program. A user has the capability to load and recall essentially an unlimited number of maps restricted only by their hard drive capacity.

Once a user quits the Sextant software and returns to the DOS environment, there needs to be a way for restarting the software from the numeric keypad. By including a file named 0.BAT in the search path, the user may restart Sextant from the external controller keypad. Pressing the zero or Ins key followed by the Enter key will run the 0.BAT batch program and call up Windows and Sextant.

Where am I Function

Figure 5:
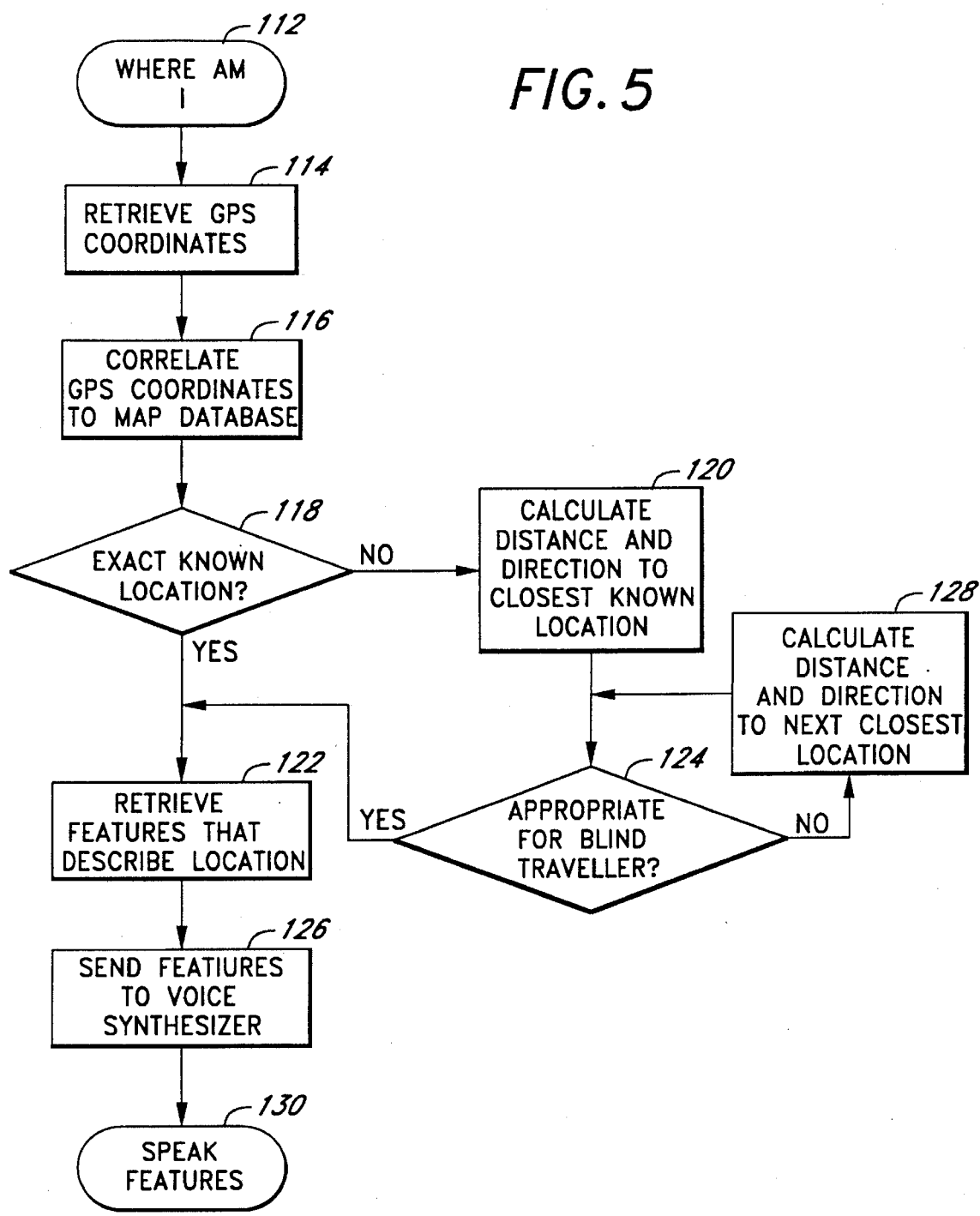
FIG. 5 is a flow diagram describing how the Sextant software chooses the proper features of a location to output to the user.

The software controls what type of information the system collects and outputs to the pedestrian at any one time. In one mode of operation, as illustrated in FIG. 5, the pedestrian wants to know his location. The pedestrian presses a "where am I" key ("0" key) on the keypad which leads to issuance of a "where am I" request at start state 112. The computer interrogates the present GPS coordinates at state 114 as a first step in determining its position.

These retrieved coordinates are compared against a preselected map database at state 116 to determine the physical address that corresponds to the coordinates. Map databases, such as those described herein, can be purchased commercially from companies such as Etak Incorporated. The coordinates retrieved in state 114 are then compared with list of pre-stored physical addresses. If the coordinates match with prestored address at decision state 118, the physical address from the map database is retrieved at state 122. If the coordinates do not match with a location in the map database, the system calculates the distance and direction to the nearest known physical address at state 120.

Importantly, the system then determines whether this information is appropriate for a vision impaired pedestrian at decision state 124. The criterion for this decision is described in more detail below in association with FIG. 6. If this location and direction information would be appropriate, the stored features of the location information are retrieved at state 122. Once the features are retrieved, the features are sent to a voice synthesizer at state 126. The voice synthesizer then converts the features into spoken words and says them at end state 130.

If the information is determined to not be appropriate for a vision impaired pedestrian, the distance and direction to the next closest physical address is determined at state 128. This loop between decision state 124 and state 128 continues until an appropriate set of information for a blind pedestrian is determined. Once an appropriate location is determined, the features of that location are retrieved at state 122. Once the features are retrieved, they are sent to a voice synthesizer at state 126 and then converted to a voice output at end state 130.

Determining if the information is appropriate for the blind pedestrian is an important component of the present invention. Whereas a person driving a car might be interested in their location relative to a physical address miles or tens of miles away, the vision impaired pedestrian is normally more concerned with their immediate environment. In addition, the physical locations that are important when driving (ie. intersections or freeway onramps) are not as relevant to the pedestrian that is trying to get to a local market. Physical locations of pedestrian overpasses, construction zones, bus stops, telephones, and even restaurants are usually more important than the distance to the nearest freeway onramp. For this reason, the system of the present invention decides what data to present to the blind pedestrian.

The decision of whether to present the closest physical address or not is determined by a set of preferences that are pre-programmed by the user. By default, pedestrian safety-related addresses are given the highest priority. These would be construction zones, raised walkways or other hazards that might pose a threat to a blind pedestrian.

Figure 6:
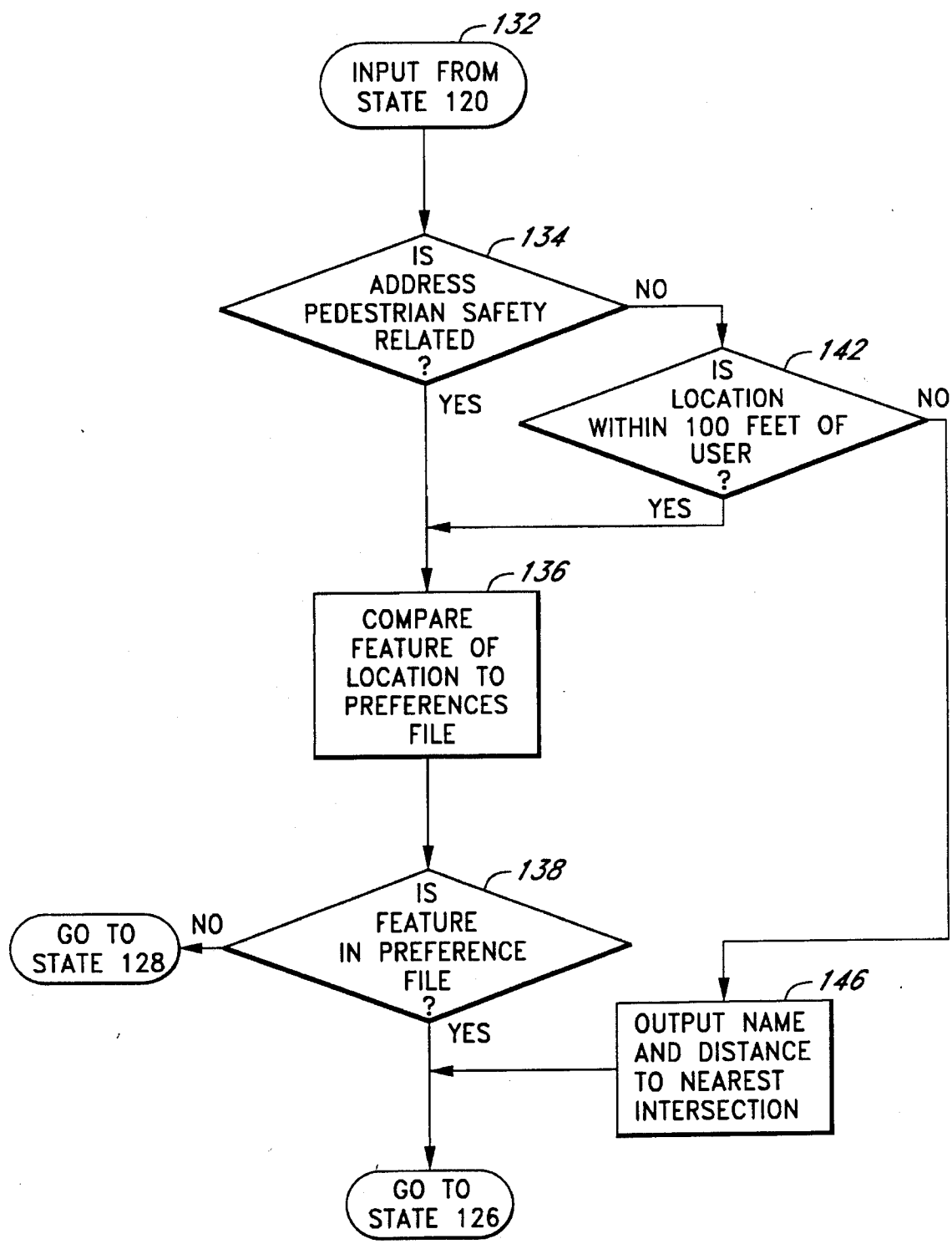
FIG. 6 is a flow diagram describing how the Sextant software chooses the locations in a map database that are appropriate for a blind pedestrian.

FIG. 6 diagrams the subroutine that corresponds to decision box 124 of FIG. 5. As such, FIG. 6 describes the subroutine that determines if a specific location is appropriate for a blind pedestrian. As illustrated in state 132 of FIG. 6, the distance to the closest location that was calculated in state 120 of FIG. 5 is passed to decision block 134.

After calculating a distance to the next closest location, a determination is made at decision state 134 if the location is pedestrian safety related. Types of locations relating to pedestrian safety are evaluated by comparison to a file containing features that are known to be a danger to blind pedestrians. For instance, intersections that do not have cross-walks which emanate a tone when it is safe to cross would be related to pedestrian safety. This type of location would presumably be of interest to a blind pedestrian. In addition, pedestrian overpasses would presumably be of interest to the visually impaired pedestrian.

If a location is related to pedestrian safety, it is passed to a comparator at state 136 which evaluates the features of the location in relation to the preferences file. A feature related to pedestrian safety could either be safe on unsafe to the pedestrian. For example, a raised walkway is a positive location related to pedestrian safety. A freeway entrance is a negative location related to pedestrian safety. Either type of location is presumably important for the blind pedestrian.

Determining if the type of location that has been retrieved is one that has been selected as a preference by the user for output is made at decision state 138. If the type of location exists in the user's preference file, its features are retrieved at state 122 of FIG. 5 and passed to the voice synthesizer at state 126 of FIG. 5 for output. If the type of location is not in the user's preference file, then the next closest location is determined in state 128 of FIG. 5.

If a location is not related to pedestrian safety, a determination is made at decision state 142 whether the location is within 100 feet of the user. If the location is within 100 feet of the user, that location is checked against the preferences file at state 136. Of course it can be appreciated that while 100 feet is preferable, distances of between 10 feet to 1000 feet are also contemplated. It is contemplated that these distances can be either preset in the software or have the ability to be input by the user.

Presumably, the blind pedestrian wishes to know about all of the preferred locations in his immediate vicinity. For this reason, those locations that are both related to safety, and within 100 feet are passed to be checked against the preferences file. If the nearest known location is not within, for example 100 feet, then the location of the nearest intersection is determined at state 146. The features associated with the intersection determined in state 122 of FIG. 5 and are passed to the speech synthesizer at state 126 of FIG. 5 for output. The system not only determines the name of the intersection at state 146, but the distance to the intersection as well. Using this information, the blind pedestrian can get an idea of how far he must travel to reach the intersection.

In summary, after a pedestrian presses the "Where am I" key ("0" key on keypad), he is preferably given the features of those locations identified in his preferences file that are related to safety AND within 100 feet of his location. If no locations are known within 100 feet, then the name and direction to the nearest intersection is spoken.

Voice History Routine

Another important mode of the Sextant software is the Start/Stop Record Mode in the "Path" section of the menu. While in the Record mode the Sextant software keeps track of the pedestrian's movements as he progresses along a path. For example, every 180 seconds the Sextant software records the current GPS coordinates and saves them to a sequential file. In this manner a history of the traveled path is built. It can be appreciated that the period of time between recording GPS coordinates can be varied by the user. If the user wants a more detailed map, he can set the time period to every 30 seconds, whereas if a less detailed map is required the time period can be set for every 10 minutes. After reaching a destination, the user can run the included "compact" routine to purge any miscellaneous GPS coordinates from the recorded file.

Figure 7:
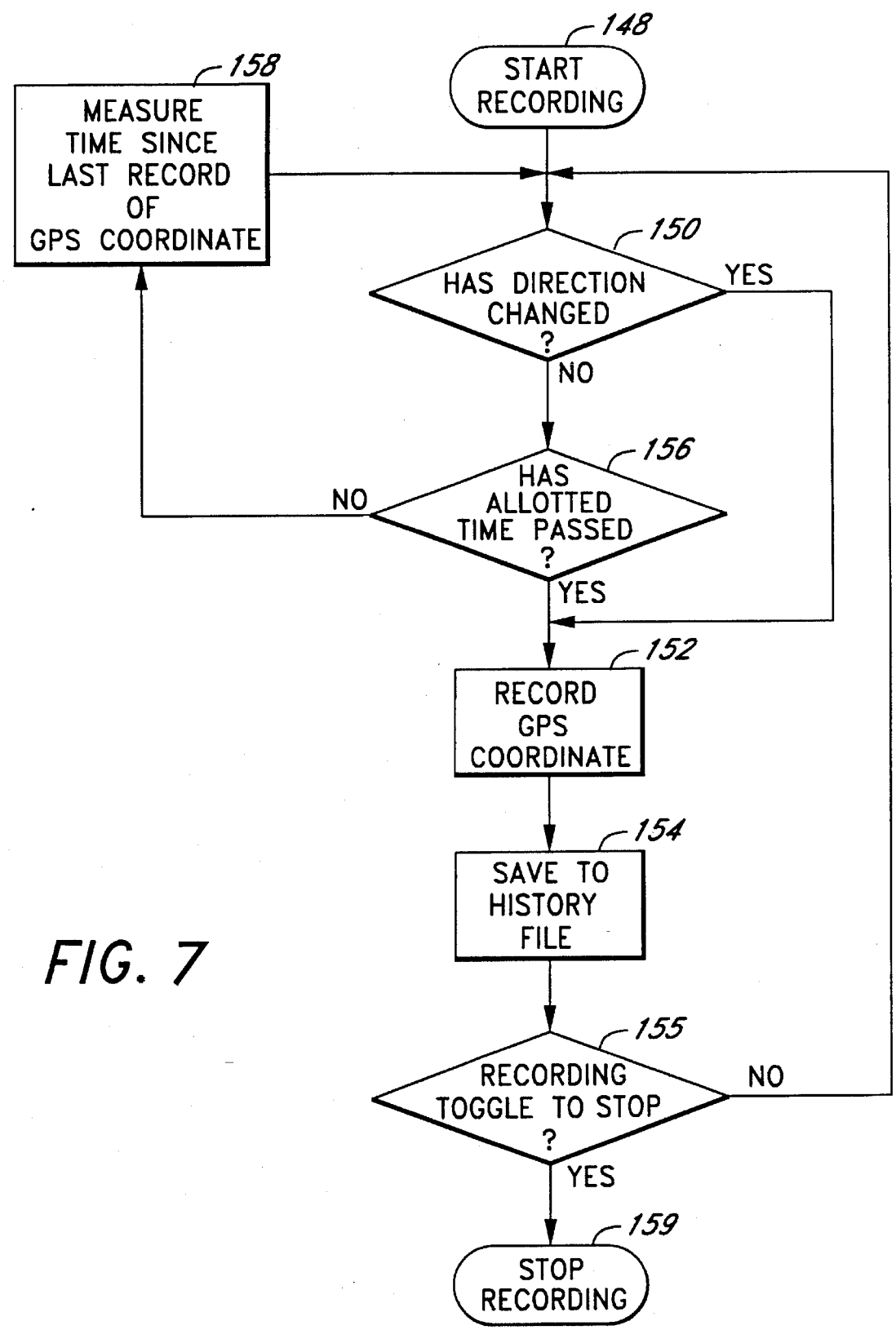
FIG. 7 is a flow diagram showing a subroutine of the Sextant software that produces a history file of the user's position along a path.

By stepping though the history file, the user can determine exactly the path that was taken to reach the destination. Importantly, this review process can be started while still enroute as a method of assuring a blind pedestrian that he is still on the proper route. For example, during a walk the pedestrian can initiate a path recording by pressing the Record button to begin saving his GPS positions every three minutes. FIG. 7 illustrates a flow chart of the recording subroutine. As can be appreciated, the desire to save the GPS coordinates every three minutes is a preference chosen by the pedestrian. In a similar fashion, the Sextant system could record GPS coordinates every 10 seconds, or every hour. After the user toggles the start recording key to initiate the recording session as shown in start state 148 the system begins storing the incoming GPS coordinates. If a change of direction is detected at decision state 150, the system immediately records the GPS coordinate at state 152 and saves it to disk in a history file at state 154. At decision state 155, the system checks to see if the stop recording toggle has been set. If the stop recording toggle has been set at state 155, the recording session is ended at state 159. If the stop recording toggle has not been set, control passes back to decision block 150 to determine if a direction change has occurred.

If no change of direction is detected at decision state 150, the system checks to see if the allotted time, for example, three minutes has passed in decision state 156. If the allotted time has not passed, the system measures the time from the last GPS recordation at state 158 and then loops back to decision state 150 to check for a change of direction since the last cycle. If no direction change has been made, but the allotted time has passed, the GPS is recorded at state 152 and saved to disk in a history file at end state 154. As described above, at decision state 155, the system checks to see if the stop recording toggle has been set. If the stop recording toggle has been set, the recording session is ended. If the stop recording toggle has not been set, control passes back to decision block 150 to determine if a direction change has occurred.

If the user wants to review, for example, the past 5 locations to determine where he has been, the history file is retrieved. Sextant then correlates the saved GPS coordinates with the map database to determine the closest known locations to each saved coordinate. Because the system is defaulted to always save information on change of direction, the user will almost always have a listing of the points where he made direction changes. In this manner, the system can replay the last few positions by saying "starting at Cedar Street, you walked 100 feet to Third Avenue and turned left. After one-half mile you turned right on Broadway and walked 25 feet to your current position." It is convenient for the history file to keep track of the turns, i.e., right or left, that a blind pedestrian makes because the headings "North" and "South" have little meaning without either a compass or visual clues to orient the pedestrian.

Voice Skip Function

Figure 8:
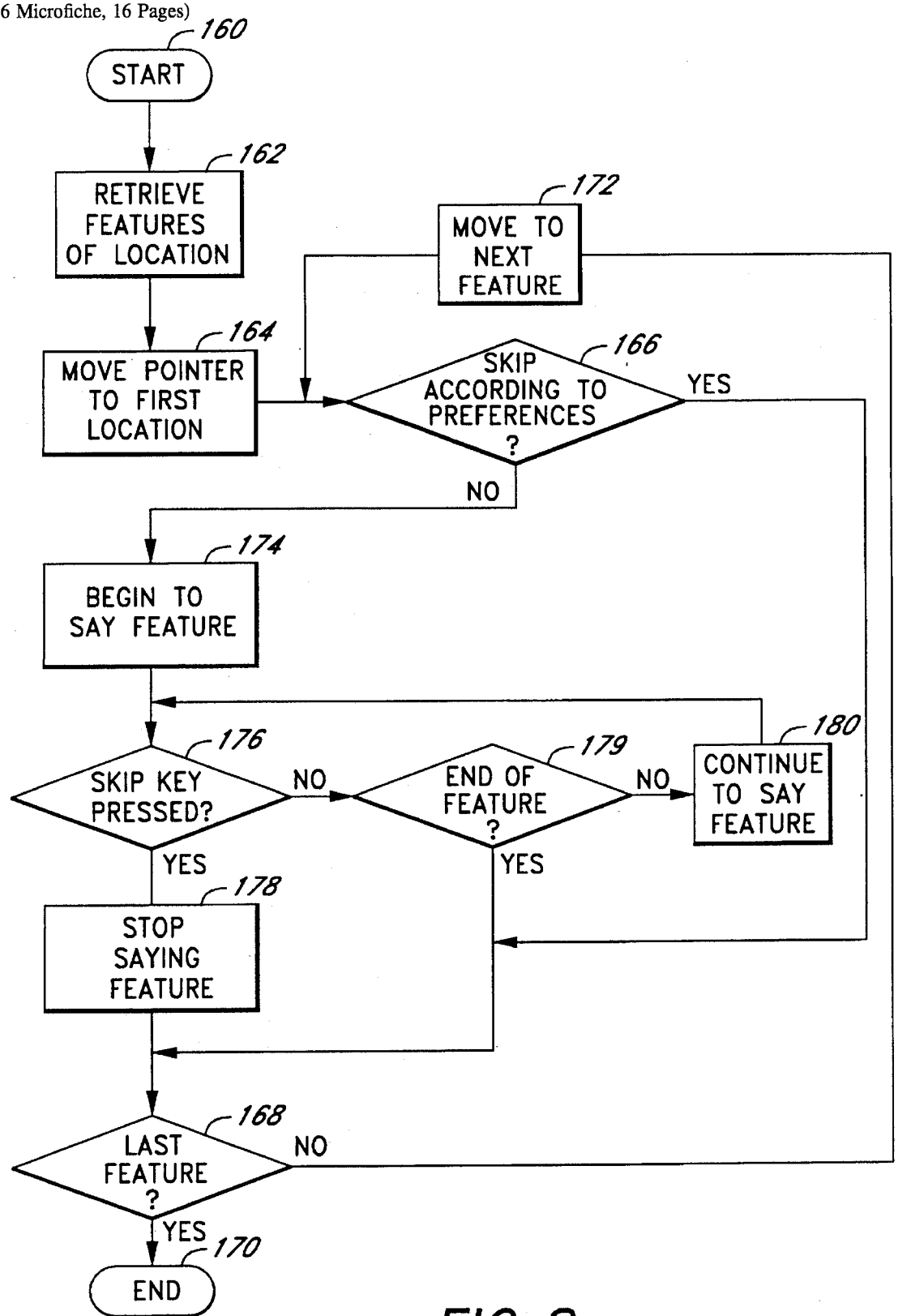
FIG. 8 is a flow diagram illustrating a subroutine of the Sextant software that allows skipping of specific spoken features of a location as they are output to the voice synthesizer.

The voice skip function is exemplified in FIG. 8. Once a user requests that features of a location be spoken, the voice skip function is called. Following start state 160, the features of the desired location are retrieved in state 162. As discussed above, features of a location are descriptions such as the street address, city, state or hours of operation. Once the list of features has been retrieved a pointer moves to the first feature in the list at state 164. A comparison of the type of feature with pre-stored preferences is made at decision state 166 to evaluate if the user wants to be told this type of feature. For example, a user might never want to know the feature of a location that corresponds to the ZIP code. Presumably, ZIP code information would not be very helpful to a blind pedestrian while walking along his path. The preferences file would therefore contain a command that always told the system to skip features that were in the class "ZIP code".

If the feature is marked to be skipped in the preference file, the Sextant evaluates whether the current feature is last in the list in decision state 168. If the current feature is last, the routine terminates at end state 170. If the current feature is not the last feature, the next feature in the list is retrieved at state 172. The next feature is then evaluated at decision state 166, as discussed above in relation to the first feature, to determine if it should be skipped according to the preference file. This cycle continues until either the last feature has been retrieved or the feature is evaluated at decision state 166 to not be skipped.

If a feature is marked as to not be skipped in the preferences file, that feature is output to the voice synthesizer in state 174. As this feature is being output to the voice synthesizer, the software begins a loop to check if the "skip" key has been pressed. At decision state 176, the software evaluates whether the "skip" key has been pressed. If the "skip" key has been pressed, the output to the synthesizer is discontinued at state 178 so that the computer immediately stops saying the current feature. Once the computer has stopped saying the current feature at state 178, the software evaluates whether the current feature is the last feature in the list at decision state 168. If the current feature is the last feature, the routine ends. If the current feature is not the last feature, the pointer moves to the next feature in the list at state 172 and the cycle begins anew.

If the feature being output to the voice synthesizer at state 174 is not interrupted at decision state 176, the output is check to see if the voiced output of the feature has been completed at decision state 179. If the voice output has not been complete, the output continues at state 180. If the output has been completed, control passes to decision block 168 to check if the present feature is the last feature in the list.

This loop provides a means for continually outputting a voice to the synthesizer, but including the capability of skipping an unwanted feature. As can be appreciated from FIG. 8, only features that are designated in the Preferences file to be output, and not skipped at decision state 176, are sent to the voice synthesizer. This system thereby provides a means for skipping unwanted features of any location in the map database.

The present invention provides a host of advantages for a pedestrian trying to navigate in an unfamiliar region. These advantages are particularly useful for a blind pedestrian. The system of the present invention can determine its location with incredible accuracy and then verbally describe features of the determined location in terms that are easy to understand. By using the system described herein, a blind pedestrian can efficiently navigate through a maze of city streets, thereby providing him with a greater degree of independence.

While the above detailed description has described the fundamental novel features of the invention as applied to various embodiments, it will be understood that various omissions, substitutions and changes in the form and details of the device illustrated may be made by those skilled in the art, without departing from the spirit of the invention.

We claim:

1. A system for determining the geographic position of a blind pedestrian, comprising:

a global positioning system (GPS) receiver;

a computer receiving first coordinates from said GPS receiver representing the system's position;

instructions for accessing second coordinates representing locations in a region where said system is located to said computer, said instructions further accessing an associated feature list which contains specific features that describe said location and a file created during use of said system relative to locations travelled by said blind pedestrian;

first instructions in said computer for defining plurality correlations between said first coordinates and said second coordinates;

second instructions in said computer for selecting one of said plurality correlations and its associated features that are appropriate for said blind pedestrian; and a voice synthesizer linked to said computer for phonetically describing the selected correlation and its associated features and relative to said file so that said pedestrian can audibly determine his position relative to said location.

2. The system of claim 1 wherein said database is a map database.

3. The system of claim 1 wherein said database further comprises a user-defined database of locations.

4. The system of claim 1 wherein said computer is a notebook computer.

5. The system of claim 1 wherein said system further comprises a differential global positioning system (DGPS) receiver linked to said system to improve the positioning accuracy of the system.

6. The system of claim 1 wherein said feature list includes items selected from the group consisting of: address, city, state, ZIP code and hours of operation.

7. The system of claim 1 wherein said system including instructions for skipping specific spoken features in said feature list.

8. The system of claim 7 wherein said instructions for skipping specific spoken features in a feature list include instructions for terminating the speech output of the currently output feature.

9. The system of claim 1 wherein said locations on a map do not represent a single point on said database, but represent a zone comprising a plurality of locations.

10. The system of claim 9 wherein said zone of locations is a zone of avoidance.

11. The system of claim 10 wherein said zone of avoidance is selected from the group consisting of: a construction area, a freeway onramp and a park.

12. A system for tracking the movement of a handicapped pedestrian along a path, comprising:

a global positioning system (GPS) receiver;

a computer for receiving first coordinates from said GPS receiver;

a database providing said computer second coordinates representing locations in a region where said system is located, said database further comprising an associated features list which contains specific features describing said locations;

a first set of instructions for said computer for correlating said first coordinates with said second coordinates to generate correlation data;

a second set of instructions for said computer for repeatedly executing said first set of instructions as said pedestrian move along a path to produce a first correlation data set, and for saving said first correlation data set in a history file;

a third set of instructions for outputting a phonetic description of the associated features describing each of the locations in said first correlation data set; and a voice synthesizer linked to said computer for verbalizing the output of the phonetic description so that said pedestrian can replay said history file to hear descriptions of locations that have been passed along said path.

13. The system of claim 12 wherein said output of said phonetic description is in a manner appropriate for a blind pedestrian.

14. The system of claim 12 wherein said second set of instructions retrieves said GPS coordinates every 180 seconds.

15. The system of claim 12 wherein said path is a predetermined path that had been stored in said computer.

16. The system of claim 15 wherein said system further comprises a fourth set of instructions for notifying the pedestrian when he has veered off of the predetermined path.

17. The system of claim 12 wherein said database is a map database.

18. The system of claim 12 wherein said database further comprises a user-defined database of locations.

19. The system of claim 12 wherein said computer is a notebook computer.

20. The system of claim 12 wherein said system further comprises a differential global positioning system (DGPS) receiver linked to said system to improve the positioning accuracy of the system.

21. A method for tracking a handicapped pedestrian along a path, comprising:

receiving a first set of coordinates from a global positioning system (GPS) system corresponding to the location of said pedestrian travelling along a path;

determining from said coordinates whether the pedestrian has changed direction and storing said coordinates and features associated with said coordinates at the point of direction change in a history file;

storing said coordinates and said associated features to said history file whenever a predetermined period of time has passed, so that said history file contains a list of features associated with locations where the pedestrian changed direction as well as a list of features associated with locations taken at specific time intervals along the pedestrian's path; and phonetically describing to said pedestrian his position relative to said location and said associated features.

22. The method of claim 21 wherein said coordinates are received by a combination of a GPS receiver and a differential global positioning system (DGPS) receiver.

23. The method of claim 21 wherein said predetermined period of time is 180 seconds.

24. The method of claim 21 wherein said pedestrian is a blind pedestrian.

25. The method of claim 21 wherein said history file is compacted so that only preferential points along the path are retained in the history file.

26. The method of claim 25 wherein said history file is compacted by correlating the received coordinates with nearby locations, and then comparing the features of said nearby locations with a preference file to determine those points that are preferentially retained in said history file.

27. The method of claim 25 wherein said preferential points are intersections.

* * * * *